(12) United States Patent
Ge et al.

(10) Patent No.: US 11,977,288 B1
(45) Date of Patent: May 7, 2024

(54) TOUCH DISPLAY PANELS AND TOUCH DISPLAY DEVICES

(71) Applicant: WUHAN CHINA STAR OPTOELECTRONICS TECHNOLOGY CO., LTD., Hubei (CN)

(72) Inventors: Haosen Ge, Hubei (CN); Mang Zhao, Hubei (CN); Xiaoxu Lian, Hubei (CN); Qiang Gong, Hubei (CN)

(73) Assignee: WUHAN CHINA STAR OPTOELECTRONIC TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/458,151

(22) Filed: Aug. 30, 2023

(30) Foreign Application Priority Data

Dec. 19, 2022 (CN) .......................... 202223427224.X

(51) Int. Cl.
*G02F 1/1333* (2006.01)
*G02F 1/1335* (2006.01)
*G06F 3/041* (2006.01)

(52) U.S. Cl.
CPC ........ *G02F 1/13338* (2013.01); *G06F 3/0412* (2013.01); *G02F 1/133512* (2013.01); *G02F 1/133514* (2013.01)

(58) Field of Classification Search
CPC ........... G02F 1/13338; G02F 1/133512; G06F 3/0412
USPC ......................................................... 349/12
See application file for complete search history.

(56) References Cited

U.S. PATENT DOCUMENTS

2019/0302554 A1* 10/2019 Chang ............... G02F 1/136227

* cited by examiner

*Primary Examiner* — Charles S Chang
(74) *Attorney, Agent, or Firm* — PV IP PC; Zhigang Ma; Wei Te Chung

(57) ABSTRACT

A touch display panel includes first and second substrates that are disposed opposite to each other, and a liquid crystal layer between the first and second substrates. The first substrate includes a base substrate, a plurality of data lines, at least two touch wirings, at least two touch electrodes, and a pixel electrode. The data lines and the touch wirings are disposed on the base substrate. The touch electrodes are provided at a side of the data lines away from the base substrate. There is a gap between two adjacent touch electrodes. In a direction perpendicular to the base substrate, the gap overlaps with at least a portion of the touch wirings, the data lines overlap with the touch electrodes, and the data lines do not overlap with the gap. The pixel electrode is disposed at a side of the touch electrodes away from the base substrate.

18 Claims, 5 Drawing Sheets

TOUCH DISPLAY PANELS AND TOUCH DISPLAY DEVICES

CROSS-REFERENCE TO RELATED APPLICATION

This application claims priority to and the benefit of Chinese Patent Application No. 202223427224.X, filed on Dec. 19, 2022, the disclosure of which is incorporated herein by reference in its entirety.

TECHNICAL FIELD

The present disclosure relates to display technologies, and in particular, to touch displays panel and touch display devices.

BACKGROUND

A current touch display panel may be classified into two categories according to a position of a touch wiring: On Cell touch display panel and In Cell touch display panel. In the In Cell touch display panel, the touch control function is integrated inside the display panel without occupying a thickness space outside the display panel, thereby reducing a thickness of the touch display panel and becoming a mainstream touch method at present.

An electric field generated between a data line and a pixel electrode of a conventional touch display panel passes through a gap between two adjacent touch electrodes, and the electric field interferes with a rotation direction of liquid crystal molecules in a liquid crystal layer, thereby affecting a display effect of the touch display panel.

SUMMARY

An embodiment of the present disclosure provides a touch display panel including a first substrate and a second substrate disposed opposite to each other, and a liquid crystal layer disposed between the first substrate and the second substrate, the first substrate including: a first base substrate; a plurality of data lines disposed on the first base substrate; at least two touch wirings disposed on the first base substrate; at least two touch electrodes disposed at a side of the data lines away from the first base substrate, there is a gap between two adjacent touch electrodes of the at least two touch electrodes, and in a direction perpendicular to the first base substrate, the gap overlaps with at least a portion of a corresponding touch wiring of the at least two touch wirings, the data lines overlap with the at least two touch electrodes, and the data lines do not overlap with the gap; a pixel electrode disposed at a side of the at least two touch electrodes away from the first base substrate.

Alternatively, in some embodiments provided herein, an orthographic projection of the gap on the first base substrate completely covers the at least a portion of the corresponding touch wiring of the at least two touch wirings in the direction perpendicular to the first base substrate.

Alternatively, in some embodiments provided herein, the data lines and the at least two touch wirings are arranged in a same layer, and one of the at least two touch wirings is arranged between two adjacent data lines of the data lines.

Alternatively, in some embodiments provided herein, the at least two touch wirings are parallel to the data lines.

Alternatively, in some embodiments provided herein, the pixel electrode is disposed at a side of the at least two touch electrodes away from the first base substrate, and an orthographic projection of the pixel electrode on the first base substrate partially covers the gap.

Alternatively, in some embodiments provided herein, the second substrate includes a second base substrate and a color filter layer disposed at a side of the second base substrate close to the liquid crystal layer. The color filter layer includes a black matrix layer and a plurality of color resist sections, the black matrix layer includes a plurality of first black matrix blocks disposed at intervals, and each of the color resist sections is disposed between two corresponding adjacent first black matrix blocks of the first black matrix blocks. In the direction perpendicular to the first base substrate, at least a portion of each of the first black matrix blocks overlaps with a corresponding data line of the data lines, and the at least two touch wirings do not overlap with the first black matrix blocks.

Alternatively, in some embodiments provided herein, the black matrix layer further includes a plurality of second black matrix blocks disposed at intervals, at least a portion of each of the second black matrix blocks overlaps with a corresponding touch wiring of the at least two touch wirings in the direction perpendicular to the first base substrate.

Alternatively, in some embodiments provided herein, the at least two touch electrodes further serve as common electrodes and the at least two touch wirings further serve as common electrode lines.

Alternatively, in some embodiments provided herein, the first substrate further includes a color filter layer disposed at a side of the at least two touch electrodes away from the first base substrate, the color filter layer includes a black matrix layer and a plurality of color resist sections.

Accordingly, an embodiment of the present disclosure further provides a touch display device including the touch display panel described above.

BRIEF DESCRIPTION OF THE DRAWINGS

In order to more clearly explain the technical solutions in the embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

DETAILED DESCRIPTION

Figure 1:
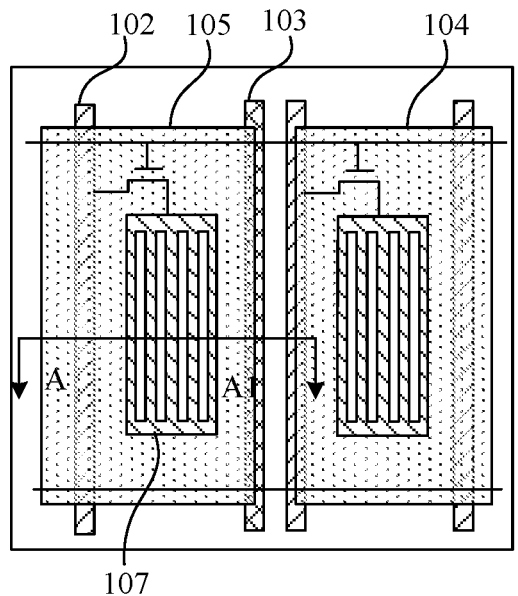
FIG. 1 is a first plan view of a touch display panel according to a comparative embodiment of the present disclosure.

In order to make the objects, technical solutions, and advantages of the present disclosure clearer, the present disclosure will be described in further detail below with reference to the accompanying drawings, in which like reference numerals refer to like elements, and the following description is based on the specific embodiments of the present disclosure and should not be construed as limiting other specific embodiments not described in detail herein. As used in this specification, the word "embodiment" means an example, instance, or illustration.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

The embodiments of the present disclosure provide a touch display panel and a touch display device. Detailed descriptions are given below. It should be noted that the order in which the following embodiments are described is not intended to limit the preferred order of the embodiments.

Figure 2:
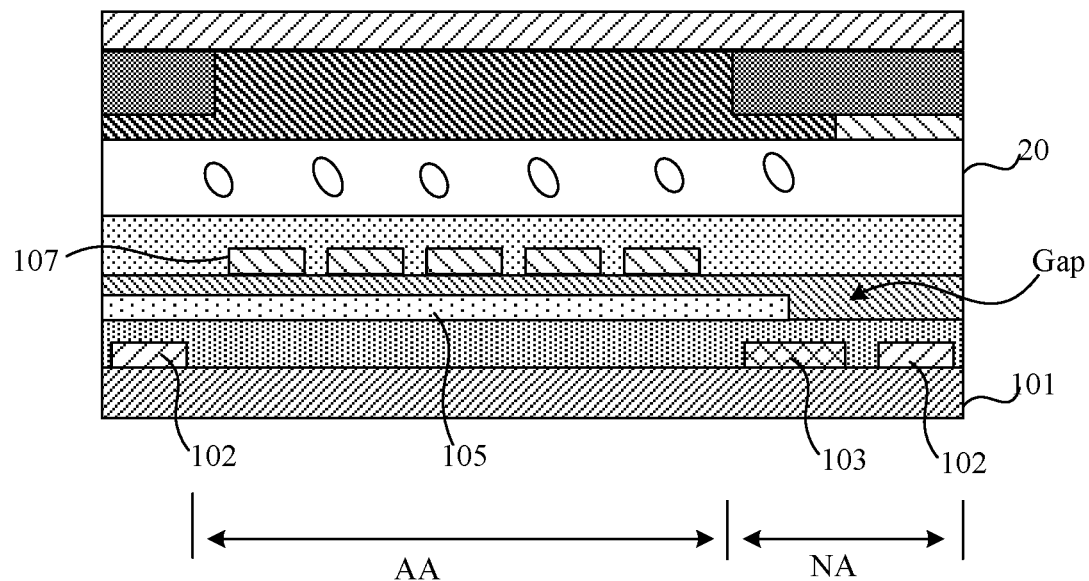
FIG. 2 is a schematic cross-sectional view taken along A-A1 direction in FIG. 1.

Referring to FIGS. 1 and 2, FIG. 1 is a schematic plan view of a first touch display panel according to a comparative embodiment of the present disclosure, and FIG. 2 is a schematic cross-sectional view taken along A-A1 direction in FIG. 1. In the touch display panel, a portion of a touch wiring 103 and a portion of a data line 102 are provided in a sub-pixel non-opening area NA. Because the touch wiring 103 and the data line 102 are in the same film layer, a certain distance (Space) needs to be reserved between the two metal wirings, resulting in a larger width of the sub-pixel non-opening area NA and a decrease in aperture rate of the sub-pixel. At the same time, since the touch wiring 103 is provided next to the data line 102, there is a problem that it is difficult to manufacture and is prone to short circuit during manufacturing, and there is a high yield loss. However, a gap Gap between two adjacent touch electrodes 105 in this embodiment is generally located between the touch wiring 103 and the data line 102, and the touch wiring 103 and the data line 102 may be partially or completely covered by the touch electrodes 105. Therefore, the touch electrode 105 may have a shielding effect on an electric field generated by voltage jump of the data line 102. When different pictures are displayed on the touch display panel 100, the voltage jump of the data line 102 has no visible effect on the rotation of the liquid crystal molecules of the liquid crystal layer 20 above the touch electrodes 105, and the display effect is good.

Figure 3:
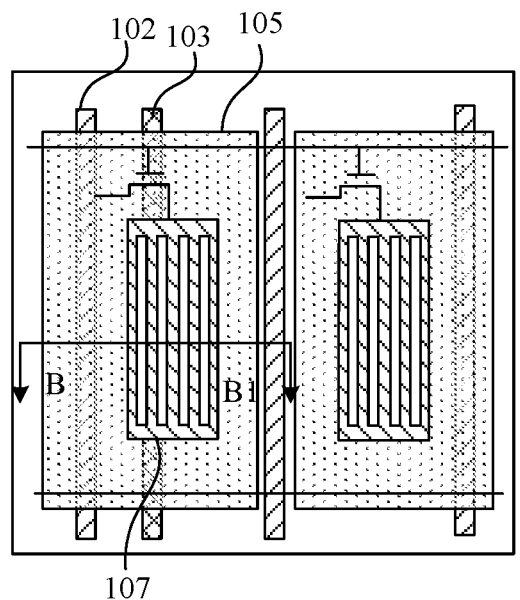
FIG. 3 is a second plan view of a touch display panel according to a comparative embodiment of the present disclosure.
Figure 4:
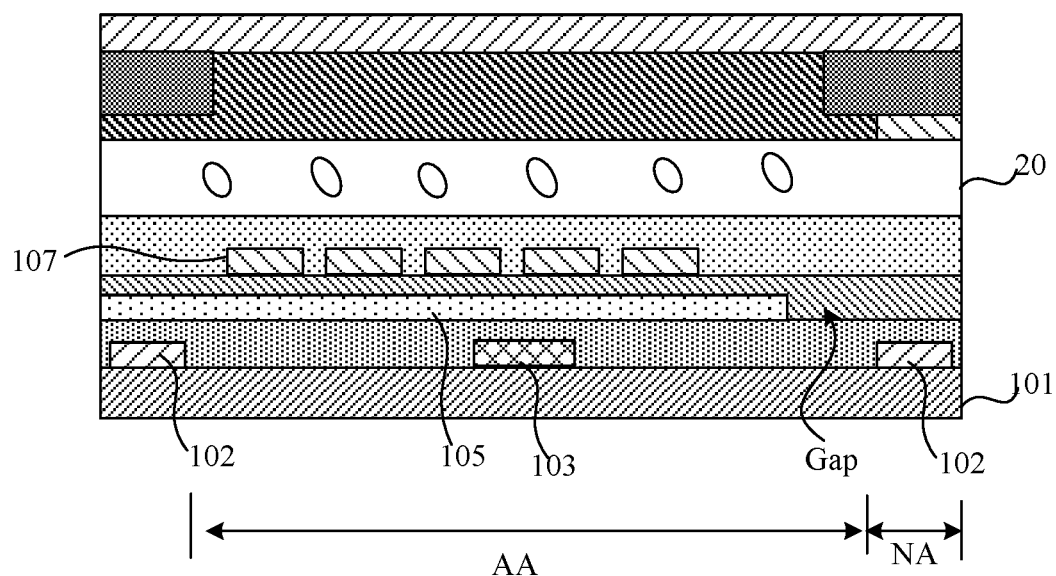
FIG. 4 is a schematic cross-sectional view taken along B-B1 direction in FIG. 3.

Referring to FIGS. 3 and 4, FIG. 3 is a second schematic plan view of a touch display panel according to a comparative embodiment of the present disclosure, and FIG. 4 is a schematic cross-sectional view taken along B-B1 direction in FIG. 3. In the touch display panel, a touch wiring 103 is disposed in a sub-pixel opening area AA, and a gap Gap between two adjacent touch electrodes 105 is generally arranged in a sub-pixel non-opening area NA. A data line 102 is arranged corresponding to the sub-pixel non-opening area NA. In this arrangement, a gap Gap between the two adjacent touch electrodes 105 partially or completely overlaps with the data line 102, but does not overlap with the touch wiring 103. In the touch display panel 100 of this design, when the data voltage is changed, the electric field generated between the data line 102 and the pixel electrode 107 may pass through the gap Gap between the two adjacent touch electrodes 105 to interfere with the rotation direction of the liquid crystal layer 20 above. Since the column inversion method is generally used for the display, voltages of the adjacent data lines 102 are opposite to each other. When displaying a gray background and a white frame in the middle, the crosstalk problem is serious in the touch display panel of this design scheme, and the display effect is affected.

Based on the above background, an embodiment of the present disclosure provides a display panel in which an electric field generated between a data line and a pixel electrode is shielded by a touch electrode, so that the electric field formed between the data line and the pixel electrode does not interfere with a rotation direction of liquid crystal molecules in a liquid crystal layer, thereby improving a display effect of the touch display panel.

The present disclosure provides a touch display panel, the touch display panel includes a first substrate and a second substrate that are disposed opposite to each other, and a liquid crystal layer disposed between the first substrate and the second substrate. The first substrate includes a base substrate, a plurality of data lines, at least two touch wirings, at least two touch electrodes, and a pixel electrode. The plurality of data lines are disposed on the base substrate. The touch wirings are disposed on the base substrate. The touch electrodes are disposed at a side of the data lines away from the base substrate, and there is a gap between two adjacent touch electrodes. In a direction perpendicular to the base substrate, at least a portion of the touch wiring overlaps with the gap, the data line overlaps with the touch electrode, and the data line does not overlap with the gap. The pixel electrode is disposed at a side of the touch electrode away from the base substrate. In the embodiment provided in the present disclosure, the data line and the touch electrode are overlapped with each other in the direction perpendicular to the base substrate, and an electric field generated between the data line and the pixel electrode is shielded by the touch electrode, so that the electric field formed between the data line and the pixel electrode does not interfere with the rotation direction of the liquid crystal molecules in the liquid crystal layer. Therefore, the touch display panel provided in the present disclosure may improve the display effect of the touch display panel.

The touch display panel provided by the present disclosure is explained in detail below by specific embodiments.

Figure 5:
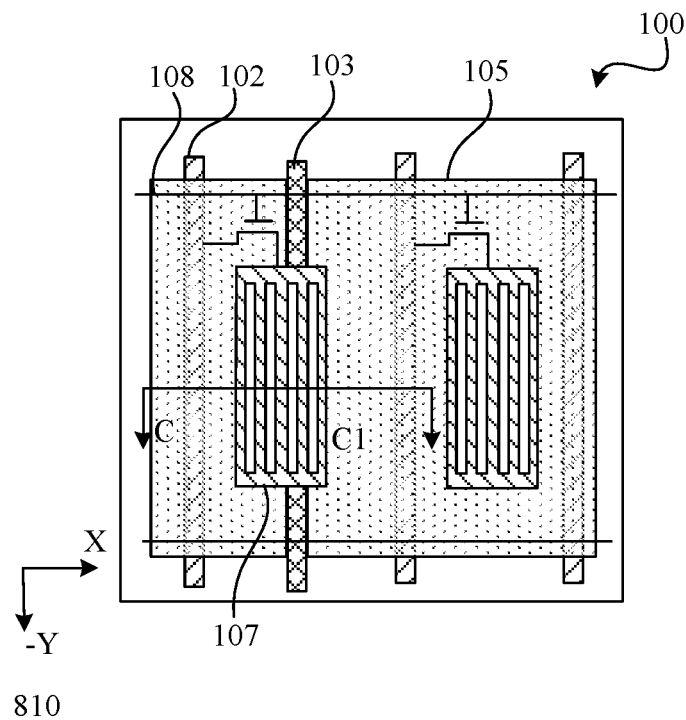
FIG. 5 is a plan view of a touch display panel according to an embodiment of the present disclosure.
Figure 6:
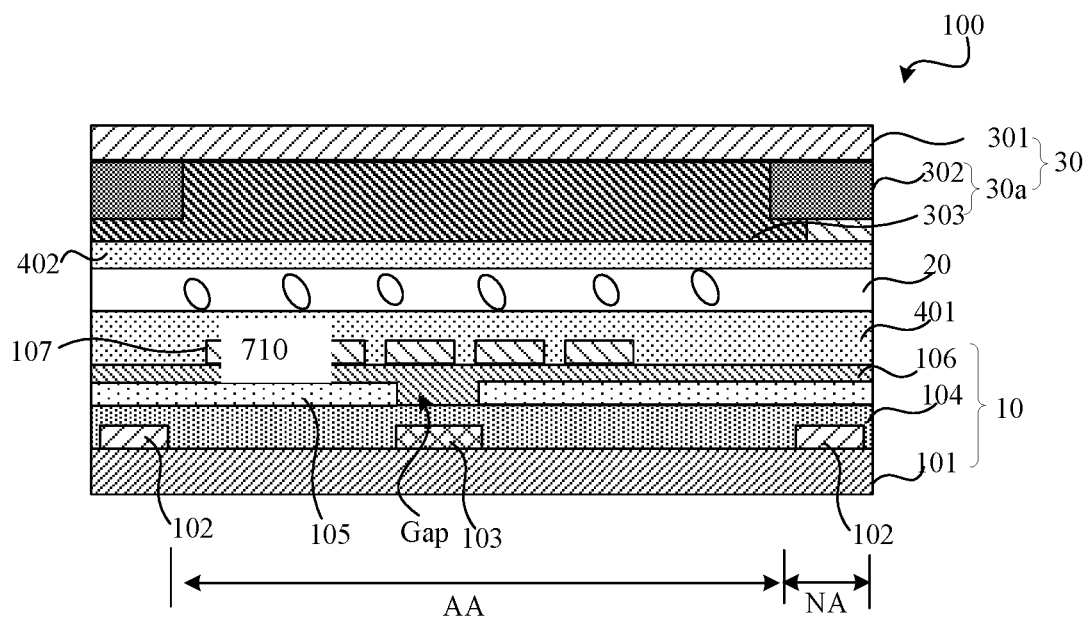
FIG. 6 is a schematic view of a first cross-sectional structure taken along C-C1 direction in FIG. 5.

Referring to FIGS. 5 and 6, FIG. 5 is a plan view of a touch display panel according to an embodiment of the present disclosure, and FIG. 6 is a schematic view of a first cross-sectional structure taken along C-C1 direction in FIG. 5. An embodiment of the present disclosure provides a touch display panel 100, the touch display panel 100 includes a first substrate 10 and a second substrate 30 that are disposed opposite to each other, and a liquid crystal layer 20 disposed between the first substrate 10 and the second substrate 30.

The first substrate 10 includes a base substrate 101, a plurality of data lines 102, a plurality of scanning lines 108, at least two touch wirings 103, a first insulating layer 104, at least two touch electrodes 105, a second insulating layer 106, and a pixel electrode 107.

Specifically, the plurality of data lines 102 are arranged on the base substrate 101 at intervals, and the plurality of data lines 102 extend in a first direction and are arranged in a second direction. The first direction and the second direction cross each other.

The plurality of scanning lines 108 are provided on the substrate 101, and the plurality of scanning lines 108 extend in the second direction and are arranged in the first direction.

It may be appreciated that the first direction is a direction extending along a —Y axis and the second direction is a direction extending along an X axis. Alternatively, the first direction and the second direction cross each other vertically, and may be set according to specifications of the touch display panel 100. Of course, in some embodiments, the second direction may be a direction extending along the —Y axis, and the first direction may be a direction extending along the X axis. It should be noted that the embodiments of the present disclosure are described by taking the first direction as the direction extending along the —Y axis and the second direction as the direction extending along the X axis as an example, which is not to be construed as limiting the present disclosure.

It should be noted that in the embodiments of the present disclosure, the scanning lines 108 and the data lines 102 cross each other to form a plurality of sub-pixels, and the sub-pixels include a red sub-pixel, a green sub-pixel, and a blue sub-pixel.

It may be appreciated that one of the sub-pixels includes one sub-pixel opening area AA and one sub-pixel non-opening area NA.

The touch wirings 103 and the data lines 102 are disposed in the same layer on the base substrate 101, and a touch wiring 103 is disposed between two adjacent data lines 102. In the present disclosure, since the touch wirings 103 and the data lines 102 are arranged in the same layer, the touch wirings 103 and the data lines 102 may be formed by the same photomask, thereby saving manufacturing costs.

In some embodiments, the touch wiring 103 is parallel to the data line 102.

The first insulating layer 104 is disposed on the base substrate 101 and covers the plurality of data lines 102 and the touch wirings 103.

The at least two touch electrodes 105 are provided at a side of the data line 102 away from the base substrate 101. Specifically, the touch electrodes 105 are provided at a side of the first insulating layer 104 away from the base substrate 101. There is a gap Gap between two adjacent touch electrodes 105. In a direction perpendicular to the base substrate 101, at least a portion of the touch wiring 103 and the gap Gap overlap with each other, the data line 102 and the touch electrode 105 overlap with each other, and the data line 102 and the gap Gap do not overlap with each other. One touch electrode 105 is connected to one touch wiring 103. In the embodiment of the present disclosure, since the data line 102 and the touch electrode 105 overlap with each other in the direction perpendicular to the base substrate 101, the electric field generated between the data line 102 and the pixel electrode 107 is shielded by the touch electrode 105, so that the electric field formed between the data line 102 and the pixel electrode 107 does not interfere with the rotation direction of the liquid crystal molecules in the liquid crystal layer 20, and the display effect of the touch display panel 100 provided in the present disclosure may improve.

In some embodiments, the touch electrode 105 further serves as a common electrode, and the touch wiring 103 further serves as a common electrode line. Since the touch electrode 105 further serves as the common electrode and the touch wiring 103 further serves as the common electrode line, the process of the liquid crystal display panel is simplified.

In an embodiment of the present disclosure, the touch display panel 100 may employ, but is not limited to, an advanced-super dimensional switching (ADS) mode, a vertical alignment (VA) mode, or a twisted nematic (TN) mode. For example, in the case where the touch electrode 105 further serves as the common electrode, the touch display panel 100 is in the ADS mode, and the common electrode may be a plate electrode, but is not limited thereto. In the case where the touch electrode 105 does not further serve as the common electrode, the common electrode may be provided on the second substrate 30, and the touch display panel 100 may be in the VA mode or the TN mode. When the touch display panel 100 is not touched, each touch electrode 105 constitutes a capacitance in a static balance state with respect to the ground signal. When the surface of the screen is touched by a finger, the touch electrode 105 is connected in parallel with a capacitance to ground, thereby causing a change in the self-capacitance of the original equilibrium state. A touch point position may be determined based on the detection of the change in the self-capacitance of the touch electrode 105, thereby realizing multi-touch.

In the case where the touch electrode 105 (described with reference to the self-capacitive electrodes) further serves as the common electrode, each touch electrode 105 further serves as the common electrode through the touch wiring 103, and the touch control and display may be realized in a time-sharing driving manner. For example, the displaying time of one frame of the touch display panel 100 may be divided into a display period (Display Time) and a touch period (Touch Time). During the display period, the touch detection chip applies a common electrode signal to the touch wirings 103 connected to the respective self-capacitive electrodes in the touch display panel 100, a scanning signal may be applied by the scanning line 108, and a gray scale signal may be applied by the data line 102, thereby realizing the display function. During the touch period, the touch detection chip applies a driving signal to the touch wirings 103 connected to the respective self-capacitive electrodes, receives a feedback signal from the respective self-capacitive electrodes, and determines whether or not the touch control occurs by analyzing the feedback signal, thereby realizing the touch control function. The touch detection chip may also be integrated with a driving IC. Within the displaying time of one frame, the display period and the touch period are interleaved, and the specific time allocation may depend on the combination of the touch scanning frequency and the processing capability of the IC chip, and is not specifically limited herein.

The second insulating layer 106 is provided at a side of the first insulating layer 104 away from the base substrate 101, and the second insulating layer 106 covers the touch electrode 105.

The pixel electrode 107 is provided at a side of the touch electrode 105 away from the base substrate 101. Specifically, the pixel electrode 107 is provided at a side of the second insulating layer 106 away from the base substrate 101. An orthographic projection portion of the pixel electrode 107 on the base substrate 101 covers the gap Gap. The pixel electrode 107 may be a slit-shaped electrode.

It should be understood that the first substrate 10 provided by embodiments of the present disclosure further includes a thin film transistor (not shown).

The second substrate 30 and the first substrate 10 are disposed opposite to each other, and the liquid crystal layer 20 is disposed between the first substrate 10 and the second substrate 30. Specifically, the second substrate 30 includes a base plate 301 and a color filter layer 30a provided at a side of the base plate 301 close to the liquid crystal layer 20. The color filter layer 30a includes a black matrix layer 302 disposed on the base plate 301 and a plurality of color resist sections 303, the black matrix layer 302 includes a plurality of first black matrix blocks 3021 disposed at intervals, each of the color resist sections 303 is disposed between two corresponding adjacent first black matrix blocks 3021, at least a portion of the first black matrix block 3021 overlaps with the data line 102 in the direction perpendicular to the base substrate 101, and the touch wiring 103 does not overlaps with the first black matrix block 3021. In the embodiment of the present disclosure, since the first black matrix block 3021 is in one-to-one correspondence with the data line 102, the first black matrix block 3021 may be used to shield the data line 102 to prevent ambient light from being reflected to the human eye by the data line 102, thereby reducing the reflectivity of the touch display panel 100. At the same time, the first black matrix block 3021 may also block oblique light rays emitted from the sub-pixels, thereby avoiding a color mixing phenomenon caused by the oblique light rays exiting through the color resist section 303 corresponding to the adjacent sub-pixels.

In addition, the operating voltage of the touch wiring 103 is the same as the voltage on the touch electrode 105, and there is no difference between the voltage of the touch wiring 103 and the voltage of the touch electrode 105 when different screens are displayed. Therefore, with the design of the touch display panel 100 described in the present disclosure, the crosstalk problem may be effectively avoided, and the overall consistency effect of displaying various images is better.

Further, since the touch wiring 103 is covered by the touch electrode 105, the first black matrix block 3021 needs to only shield the data line 102. Compared with the touch display panel provided in FIG. 2, the width of the sub-pixel opening area AA of the touch display panel 100 in the embodiment of the present disclosure becomes larger, and the aperture rate of the sub-pixel becomes larger.

The touch display panel 100 further includes a first alignment layer 401 and a second alignment layer 402, the first alignment layer 401 is disposed at a side of the liquid crystal layer 20 close to the first substrate 10, and the second alignment layer 402 is disposed at a side of the liquid crystal layer 20 away from the first substrate 10.

Figure 7:
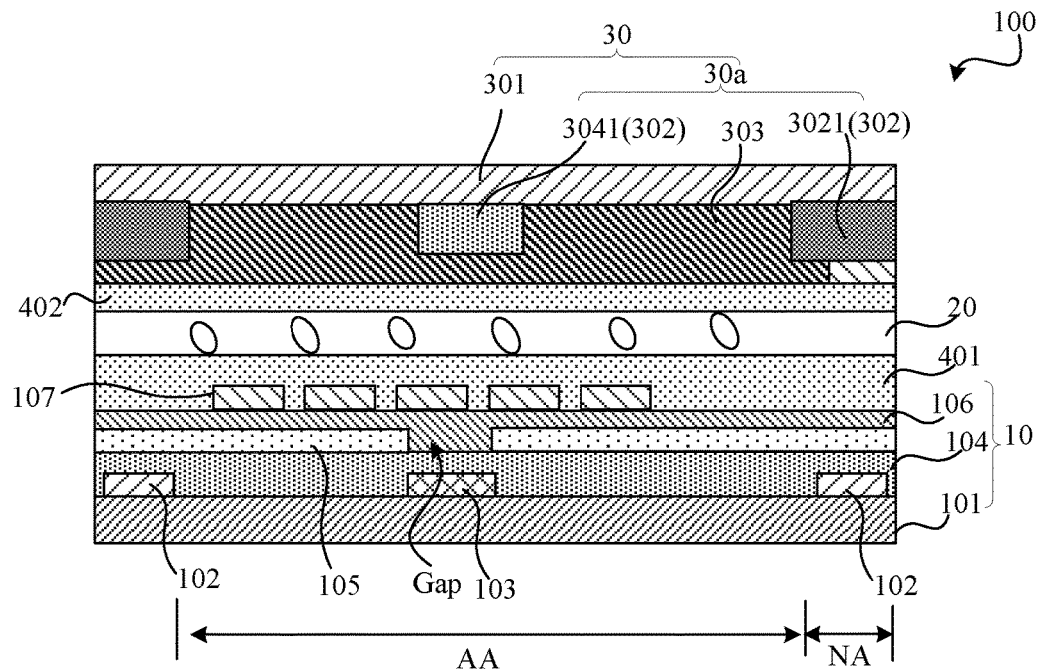
FIG. 7 is a schematic view of a second cross-sectional structure taken along C-C1 direction in FIG. 5.

Referring to FIG. 7, FIG. 7 is a schematic view of a second cross-sectional structure taken along C-C1 direction in FIG. 5. The touch display panel 100 provided in FIG. 7 differs from the touch display panel 100 provided in FIG. 6 in that the black matrix layer 302 further includes a plurality of second black matrix blocks 3041, which are disposed on the base plate 301 at intervals. One second black matrix block 3041 is disposed between two adjacent first black matrix blocks 3021, and at least a portion of the second black matrix block 3041 overlaps with the touch wiring 103 in the direction perpendicular to the base substrate 101.

In the embodiment of the present disclosure, the second black matrix block 3041 is in one-to-one correspondence with the touch wiring 103. Therefore, the second black matrix block 3041 may be used to shield the touch wiring 103 to prevent ambient light from being reflected to the human eye by the touch wiring 103, thereby reducing the reflectivity of the touch display panel 100. At the same time, the second black matrix block 3041 may also block oblique light rays emitted from the sub-pixels, thereby avoiding the color mixing phenomenon caused by the oblique light rays exiting through the color resist section 303 corresponding to the adjacent sub-pixels.

In some embodiments, the second black matrix block 3041 and the touch wiring 103 overlap with each other completely in the direction perpendicular to the base substrate 101.

Figure 8:
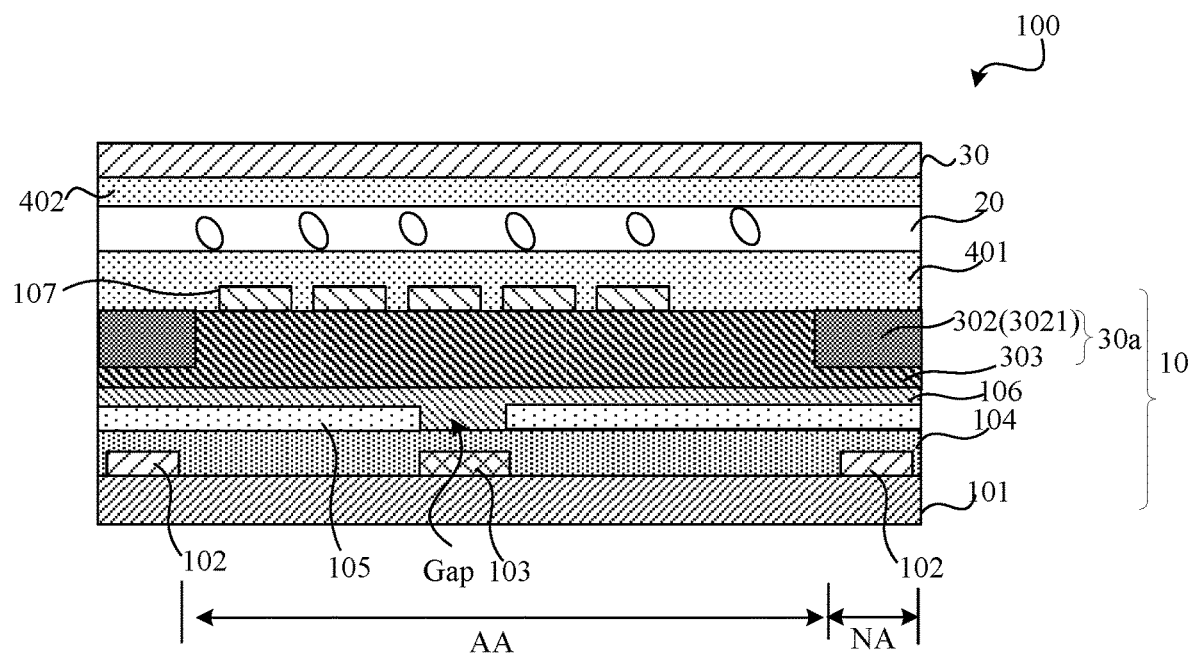
FIG. 8 is a schematic view of a third cross-sectional structure taken along C-C1 direction in FIG. 5.

Referring to FIG. 8, FIG. 8 is a schematic view of a third cross-sectional structure taken along C-C1 direction in FIG. 5. The touch display panel 100 provided in this embodiment of the present disclosure differs from the touch display panel 100 provided in FIG. 6 in that the first substrate 10 further includes a color filter layer 30a, the color filter layer 30a is disposed at a side of the touch electrode 105 away from the base substrate 101, and the color filter layer 30a includes a black matrix layer 302 and a plurality of color resist sections 303. The black matrix layer 302 includes a plurality of first black matrix blocks 3021 disposed at intervals, which correspond to the data lines 102 one by one.

It should be understood that, in the present disclosure, the color filter layer 30a is provided on the array substrate, COA (Color-filter on Array) technology is an integrated technology for fabricating the color resist layer directly on the array substrate, which can effectively solve a problem of light leakage due to alignment deviation during a cell process of the liquid crystal display panel, and can significantly improve the display aperture rate.

In the present embodiment, the second substrate 30 is a glass substrate.

Figure 9:
FIG. 9 is a schematic structural diagram of a touch display device according to an embodiment of the present disclosure.

Accordingly, an embodiment of the present disclosure further provides a touch display device. Referring to FIG. 9, FIG. 9 is a schematic structural diagram of the touch display device according to the embodiment of the present disclosure. The display device 1000 includes a backlight module 200 and a touch display panel 100, the touch display panel in this embodiment is the touch display panel 100 provided in any of the above embodiments, the touch display panel 100 is disposed on the backlight module 200, and the backlight module 200 is used to provide a backlight for the touch display panel 100.

It should be noted that the display device may be at least one of a smartphone, a tablet computer (tablet personal computer), a mobile phone, a video phone, an e-book reader, a desktop computer (desktop PC), a portable computer (laptop PC), a netbook computer, a workstation, a server, a personal digital assistant, a portable multimedia player, an MP3 player, a mobile medical machine, a camera, a game machine, a digital camera, an in-vehicle navigator, an electronic billboard, an automatic teller machine, or a wearable device.

In summary, although preferred embodiments have been described above in the present disclosure, the above-mentioned preferred embodiments are not intended to limit the present disclosure. Those of ordinary skilled in the art can make various modifications and changes without departing from the spirit and scope of the present disclosure. Therefore, the protection scope of the present disclosure is subject to the scope defined by the claims.

What is claimed is:

1. A touch display panel comprising a first substrate and a second substrate disposed opposite to each other, and a liquid crystal layer disposed between the first substrate and the second substrate, wherein the first substrate comprises:
   a first base substrate;
   a plurality of data lines disposed on the first base substrate;
   at least two touch wirings disposed on the first base substrate;
   at least two touch electrodes disposed at a side of the data lines away from the first base substrate, wherein there is a gap between two adjacent touch electrodes of the at least two touch electrodes, and wherein in a direction perpendicular to the first base substrate, the gap overlaps with at least a portion of a corresponding touch wiring of the at least two touch wirings, the data lines overlap with the at least two touch electrodes, and the data lines do not overlap with the gap; and
   a pixel electrode disposed at a side of the at least two touch electrodes away from the first base substrate.

2. The touch display panel according to claim 1, wherein an orthographic projection of the gap on the first base substrate completely covers the at least a portion of the corresponding touch wiring of the at least two touch wirings in the direction perpendicular to the first base substrate.

3. The touch display panel according to claim 1, wherein the data lines and the at least two touch wirings are arranged in a same layer, and one of the at least two touch wirings is arranged between two adjacent data lines of the data lines.

4. The touch display panel according to claim 3, wherein the at least two touch wirings are parallel to the data lines.

5. The touch display panel according to claim 1, wherein the pixel electrode is disposed at a side of the at least two touch electrodes away from the first base substrate, and an orthographic projection of the pixel electrode on the first base substrate partially covers the gap.

6. The touch display panel according to claim 1, wherein the second substrate comprises a second base substrate and a color filter layer disposed at a side of the second base substrate close to the liquid crystal layer,
   wherein the color filter layer comprises a black matrix layer and a plurality of color resist sections, the black matrix layer comprises a plurality of first black matrix blocks disposed at intervals, and each of the color resist sections is disposed between two corresponding adjacent first black matrix blocks of the first black matrix blocks, and
   wherein in the direction perpendicular to the first base substrate, at least a portion of each of the first black matrix blocks overlaps with a corresponding data line of the data lines, and the at least two touch wirings do not overlap with the first black matrix blocks.

7. The touch display panel according to claim 6, wherein the black matrix layer further comprises a plurality of second black matrix blocks disposed at intervals, at least a portion of each of the second black matrix blocks overlaps with a corresponding touch wiring of the at least two touch wirings in the direction perpendicular to the first base substrate.

8. The touch display panel according to claim 1, wherein the at least two touch electrodes further serve as common electrodes and the at least two touch wirings further serve as common electrode lines.

9. The touch display panel according to claim 1, wherein the first substrate further comprises a color filter layer disposed at a side of the at least two touch electrodes away from the first base substrate, the color filter layer comprises a black matrix layer and a plurality of color resist sections.

10. A touch display device comprising a touch display panel, wherein the touch display panel comprising a first substrate and a second substrate disposed opposite to each other, and a liquid crystal layer disposed between the first substrate and the second substrate, and
    wherein the first substrate comprises:
    a first base substrate;
    a plurality of data lines disposed on the first base substrate;
    at least two touch wirings disposed on the first base substrate;
    at least two touch electrodes disposed at a side of the data lines away from the first base substrate, wherein there is a gap between two adjacent touch electrodes of the at least two touch electrodes, and wherein in a direction perpendicular to the first base substrate, the gap overlaps with at least a portion of a corresponding touch wiring of the at least two touch wirings, the data lines overlap with the at least two touch electrodes, and the data lines do not overlap with the gap; and
    a pixel electrode disposed at a side of the at least two touch electrodes away from the first base substrate.

11. The touch display device according to claim 10, wherein an orthographic projection of the gap on the first base substrate completely covers the at least a portion of the corresponding touch wiring of the at least two touch wirings in the direction perpendicular to the first base substrate.

12. The touch display panel according to claim 10, wherein the data lines and the at least two touch wirings are arranged in a same layer, and one of the at least two touch wirings is arranged between two adjacent data lines of the data lines.

13. The touch display panel according to claim 12, wherein the at least two touch wirings are parallel to the data lines.

14. The touch display panel according to claim 10, wherein the pixel electrode is disposed at a side of the at least two touch electrodes away from the first base substrate, and an orthographic projection of the pixel electrode on the first base substrate partially covers the gap.

15. The touch display panel according to claim 10, wherein the second substrate comprises a second base substrate and a color filter layer disposed at a side of the second base substrate close to the liquid crystal layer,
    wherein the color filter layer comprises a black matrix layer and a plurality of color resist sections, the black matrix layer comprises a plurality of first black matrix blocks disposed at intervals, and each of the color resist sections is disposed between two corresponding adjacent first black matrix blocks of the first black matrix blocks, and
    wherein in the direction perpendicular to the first base substrate, at least a portion of each of the first black matrix blocks overlaps with a corresponding data line of the data lines, and the at least two touch wirings do not overlap with the first black matrix blocks.

16. The touch display panel according to claim 15, wherein the black matrix layer further comprises a plurality of second black matrix blocks disposed at intervals, at least a portion of each of the second black matrix blocks overlaps with a corresponding touch wiring of the at least two touch wirings in the direction perpendicular to the first base substrate.

17. The touch display panel according to claim 10, wherein the at least two touch electrodes further serve as common electrodes and the at least two touch wirings further serve as common electrode lines.

18. The touch display panel according to claim 10, wherein the first substrate further comprises a color filter layer disposed at a side of the at least two touch electrodes away from the first base substrate, the color filter layer comprises a black matrix layer and a plurality of color resist sections.

\* \* \* \* \*